Jan. 30, 1934.  E. PEARSON  1,944,996
SYSTEM FOR AUTOMATIC PARALLEL COUPLING OF
SYNCHRONOUS ALTERNATING CURRENT MACHINES
Filed Sept. 4, 1926  4 Sheets-Sheet 2
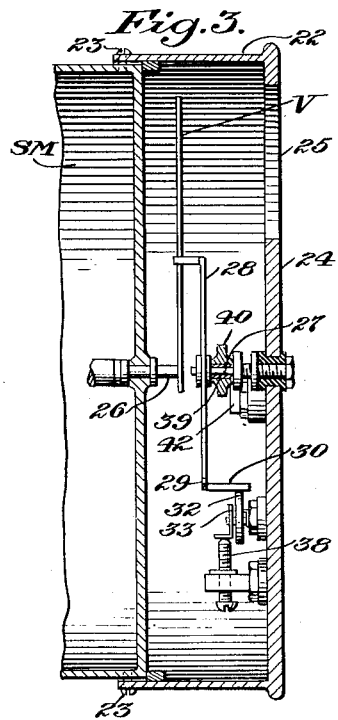
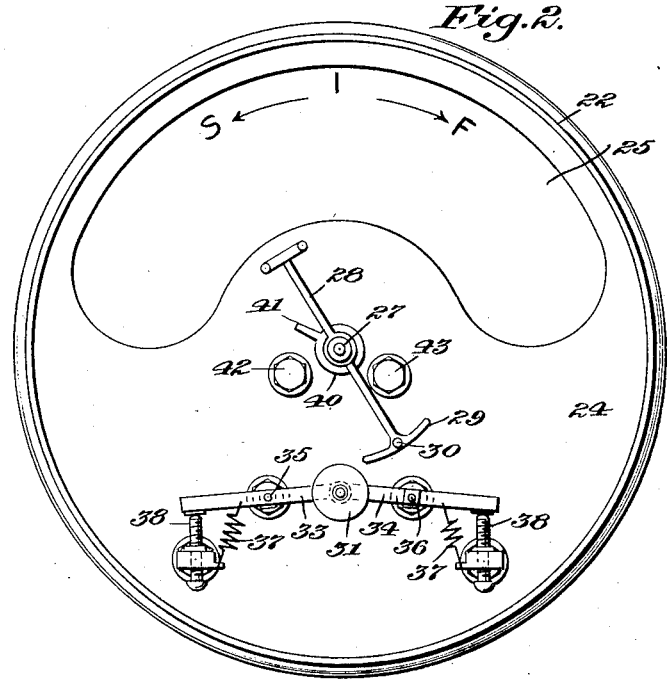
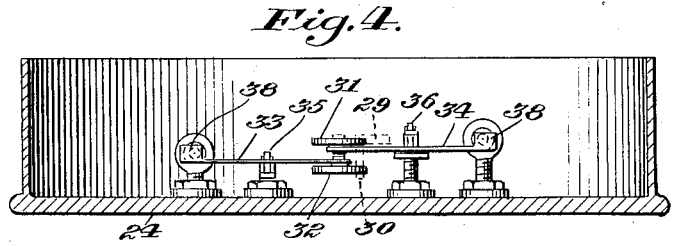
Inventor:
Erick Pearson,
Att'ys.

Jan. 30, 1934.   E. PEARSON   1,944,996
SYSTEM FOR AUTOMATIC PARALLEL COUPLING OF
SYNCHRONOUS ALTERNATING CURRENT MACHINES
Filed Sept. 4, 1926   4 Sheets-Sheet 3
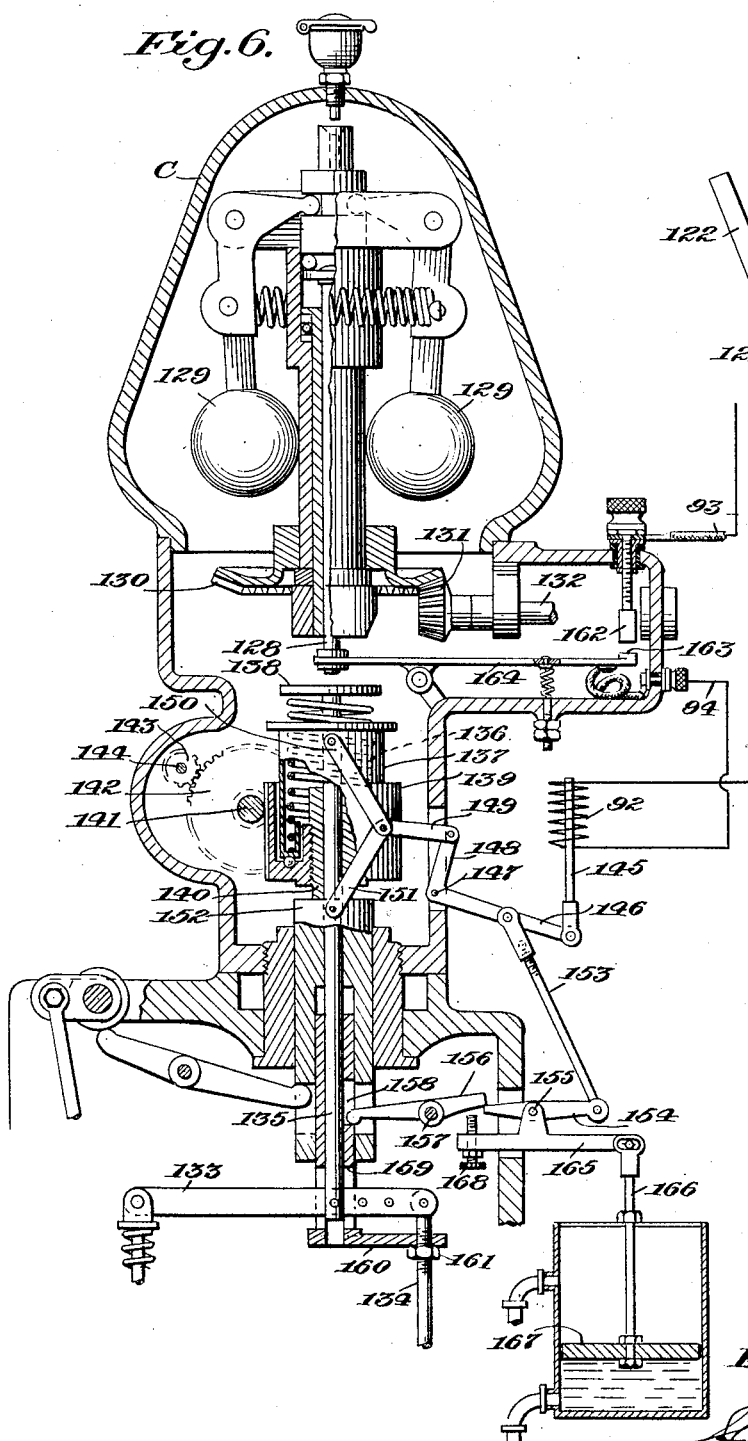
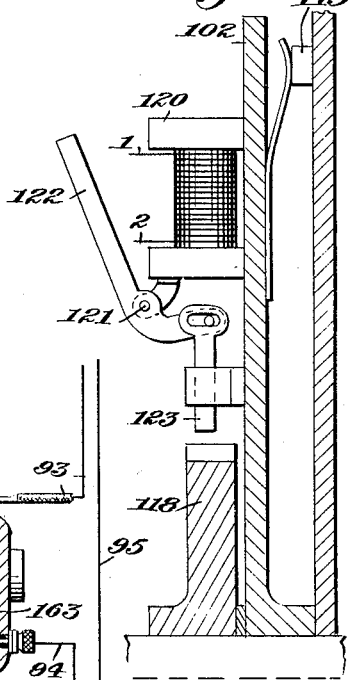
Inventor:
Erick Pearson,
Sturtevant & Mann
Att'ys.

Jan. 30, 1934.  E. PEARSON  1,944,996
SYSTEM FOR AUTOMATIC PARALLEL COUPLING OF
SYNCHRONOUS ALTERNATING CURRENT MACHINES
Filed Sept. 4, 1926  4 Sheets-Sheet 4
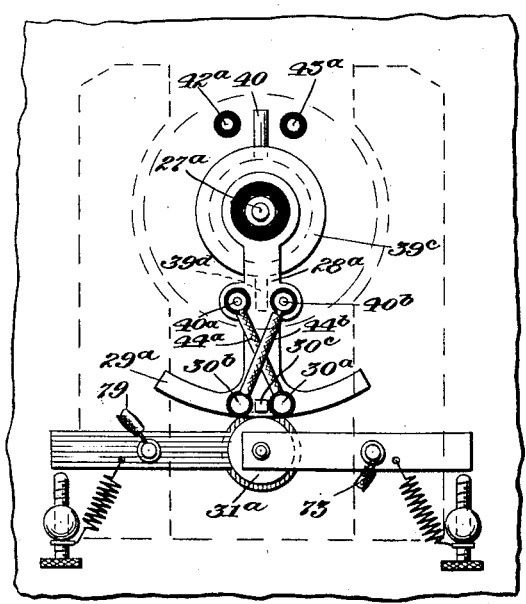
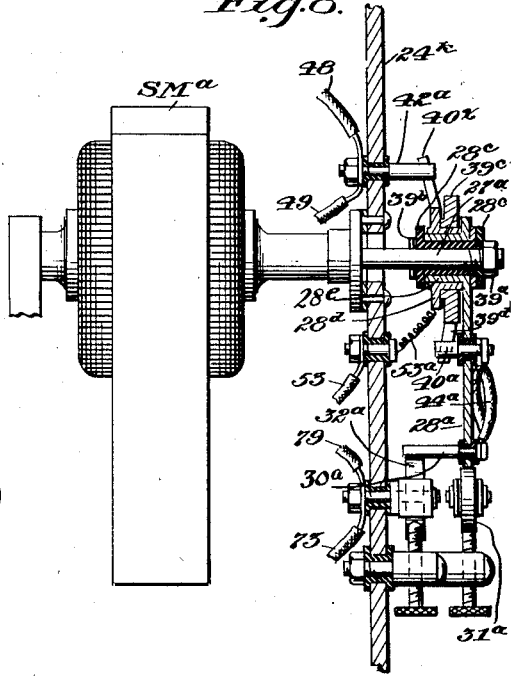
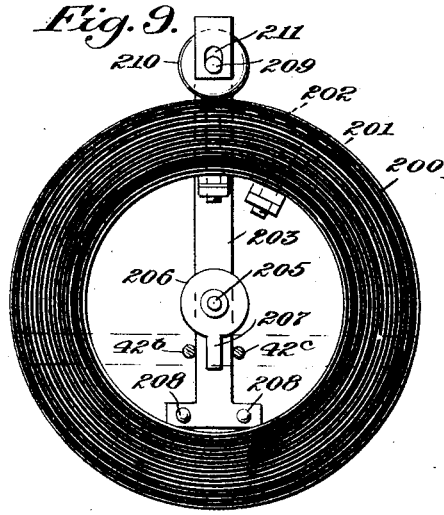
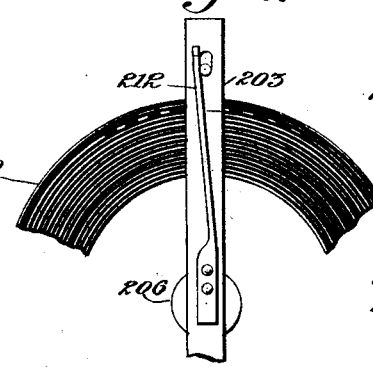
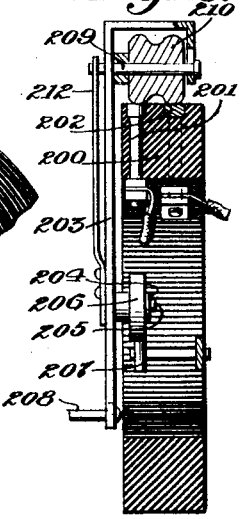
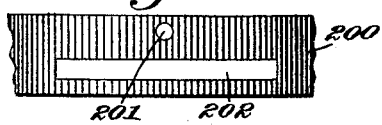
Inventor:
Erick Pearson,
Sturtevant & Mason
Attys.

Patented Jan. 30, 1934

1,944,996

UNITED STATES PATENT OFFICE 1,944,996

SYSTEM FOR AUTOMATIC PARALLEL COUPLING OF SYNCHRONOUS ALTERNATING CURRENT MACHINES

Erick Pearson, Minneapolis, Minn.

Application September 4, 1926, Serial No. 133,645, and in Sweden January 28, 1926

27 Claims. (Cl. 171—118)

The present invention concerns a system for the automatic parallel coupling of synchronous alternating current machines.

The coupling of, for example, a generator, to a power network has hitherto usually been accomplished manually, in that by aid for example of a synchronoscope which indicates when the generator potential is in phase with the network potential, the correct time is determined for the coupling. For this, it is first necessary to start the generator by aid of the source of power at disposal (water turbine, steam engine, or the like), and thereafter by hand to regulate (decrease or increase) the speed of this source of power which is driving the generator until the synchronoscope indicates that the speed is correct, whereupon the coupling of the generator to the network likewise occurs by hand. This is a rather time-consuming operation and presumes a likewise high degree of skill, since it is well known that the displacement of phase between the generator and network potentials must be within very narrow limits, in order that the coupling may be accomplished without risk.

The present invention has for object, firstly, to simplify the coupling, and secondly to exclude any risk of defective coupling. For these purposes, according to the present invention, use is made of a synchronoscope of any known type, provided with movable elements, one of these elements is directly or indirectly connected with a contact arrangement which, when the synchronoscope pointer is at or near its zero position, closes directly or indirectly in an electrical way an actuating circuit for a main circuit switch producing the coupling. With the contact arrangement actuated by the synchronoscope may also advantageously be connected another contact arrangement which, depending upon whether the phase displacement between the generator and the network is negative or positive, i. e. upon whether the power engine which is driving the generator is going too slow or too fast, will produce automatically an increase or decrease of the speed of the power engine, so that when the potentials are in or nearly in phase, the coupling of the generator to the network may occur. The invention also concerns an electrically actuated arrangement which, after the coupling has occurred, automatically tends to accelerate the power engine, so that the generator may take up the part of the network load coming upon it.

On the accompanying drawings is shown one form of execution of a system according to this invention.

Fig. 2 shows on an enlarged scale the contact arrangement actuated by the synchronoscope, seen from the inner side.

Figs. 3 and 4 are sections of the same.

Fig. 5 shows a detail.

Fig. 6 is a section of a centrifugal regulator of a type known in and for itself, provided with adjusting devices according to this invention.

Fig. 7 is a sectional view through a modified form of the synchronoscope contact devices.

Fig. 8 is a detail in front elevation of the same, with the cover plate broken away.

Fig. 9 is an end elevation of a further modified form of synchronoscope connection.

Fig. 10 is a section of the same substantially on line 10—10 of Fig. 9.

Fig. 11 is a detail of the contact cam disk.

Fig. 12 is a fragmentary face elevation of the structure in Figure 10.

Figure 1:
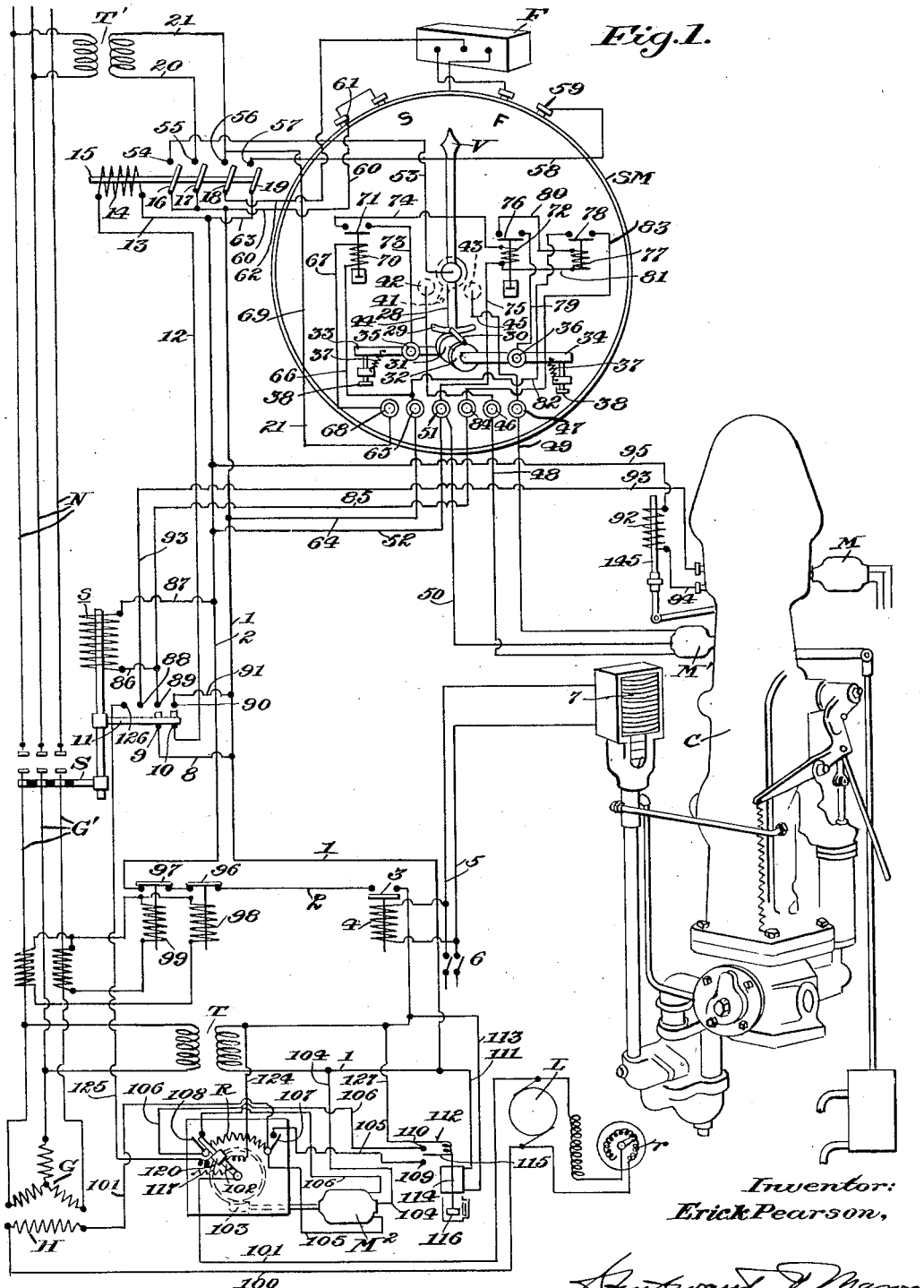
Fig. 1 shows a coupling diagram for a power station provided with an automatically operating coupling system according to this invention, in which the synchronoscope itself with its associated parts are shown on an enlarged scale.

In Fig. 1, G designates a three phase generator equipped to be coupled to a three phase network N and driven by, for example, a water turbine (not shown), whose inlet regulator is designated at C. The generator conductors are designated by G', and between the latter and the network N is disposed a main circuit switch S, which may be actuated by a solenoid s, which, when the coupling is to be accomplished, is connected through conductors 1 and 2 to the secondary side of a transformer T fed from the generator. In the said secondary circuit is likewise disposed a solenoid circuit breaker 3, whose coil 4 is coupled in a starting circut 5, which by means of a switch 6 may be closed either at the power station itself or from another station located possibly at a considerable distance therefrom. In this circuit 5 is likewise coupled a starting magnet 7 for the inlet regulator C. The centrifugal weights of the regulator are driven by a synchronous motor M, connected to the generator conductors G' (not shown).

In the said secondary circuit 1, 2, in the initial or rest position shown in Fig. 1, are likewise coupled by a conductor 8, the contacts 9 and 10, with a contact arm 11 actuated by the main switch S, s, together with conductors 12 and 13 leading to a coil 14 of a solenoid switch 15, which is provided with four coupling arms 16, 17, 18, and 19. When this switch is closed, as will be more fully described hereinafter, on the one hand the secondary conductors 20 and 21 of a transformer T' fed from the network N, and on the other hand a synchronoscope SM provided with a coupling resistance F, of known type, and further a contact arrangement of a type more fully described hereinafter, actuated through the movable pointer V of the synchronoscope, are connected in circuit.

This contact arrangement, as shown on an enlarged scale in Figs. 2 and 3, is enclosed in a casing 22, disposed to be shoved over and by means of the screws 23 secured to the casing of the synchronoscope SM. On the face 24 of the casing 22, which is provided with an opening 25 through which the pointer V may be observed, is fastened centrally and coaxially with the pointer shaft 26 a pivot pin 27 on which is journalled for free rocking movement a contact arm 28. This arm 28 is bent over and bifurcated at one end and engages over the pointer V, as is best seen in Fig. 3, while its other end is formed as a contact segment 29 whose contact surface is concentric with the pivot pin 27. At the last named end is likewise fastened a contact rod 30. The arm 28, which follows the movements of the pointer V in one direction or the other, cooperates by means of the contact segment 29 with a contact roller 31 and by means of the rod 30 with another contact roller 32, which rollers appropriately are formed of carbon or like material, so that a burning fast at the contacts is avoided. The rollers 31 and 32 are rotatably fastened at one end upon the respective arms 33 and 34, which arms are rotatably mounted on pivots 35, 36, fastened to the cover 24 of the casing 22. The arms are held at their other ends by means of lightly yielding springs 37 in pressing relation with setscrews 38 fastened in the cover 24. The time for which the contact segment 29 during its movement with the pointer V is in contact with the roller 31, on account of the relatively great length of the segment is of a certain duration at all times, dependent on the rapidity of movement of the pointer, while the contact between the rod 30 and the respective roller 32 lasts only an instant, so long as the pointer does not stand still in its central position, i. e. synchronism is not attained. On the small hub 39 of the contact arm 28 is further loosely disposed a contact disk 40, provided with a radially projecting contact rod 41 which, depending upon the direction of movement of the arm 28 by reason of the friction between the hub 39 and the disk 40, is brought into contact with one or the other of two contacts 42, 43, fastened to the cover 24.

As is to be seen from Fig. 1, the last named contacts 42, 43 are connected by conductors 44, 45 with each its respective terminal 46 and 47, which by the conductors 48, 49 are connected with a reversible motor M', which furthermore is connected by conductor 50, a terminal 51 and the conductor 52 with the phase conductor 2 of the secondary circuit of the transformer T. The contact arm 28 with disk 40 and contact rod 41 is connected through a conductor 53 with a contact 54 for the solenoid switch 15. The motor M' is actuated, through a gear and worm transmission upon a centrifugal regulator C, in and for itself of well known type, so that the latter, according to the direction of rotation of the motor M' increases or decreases the inlet to the power engine driving the generator G. The contact 56 of the switch 15 is connected to the phase conductor 21 of the synchronoscope SM. The contact arms 16 and 17 of the switch, which are electrically connected together, are connected through a conductor 60 with another terminal 61 of the synchronoscope, and the contact arm 18 is connected through a conductor 62 with the coupling resistance F, which in known manner is connected with the synchronoscope. The couplings within the synchronoscope itself are generally known in and for themselves and need not be more clearly set forth. The contact arm 19 for the switch 15, finally, is connected through a conductor 63 with the phase conductor 2.

Between the unlike phase conductors 1 and 21 is further coupled, through conductor 64, a terminal 65, the conductor 66, conductor 67, a further terminal 68 and the conductor 69, a time relay 70 actuating a switch 71 which controls the circuit for a further time relay 72. The circuit for the last named relay 72 passes through the conductor 53, the contact arm 28, the contact segment 29, the roller 31, the arm 33, the conductor 73, the switch 71, the conductor 74, the conductor 75, the terminal 51 and the conductor 52 to the phase conductor 2. The time relay 72 actuates a switch 76 which controls the circuit for a rapidly working relay 77, which in its turn actuates a working circuit for the switch 78 controlling the solenoid s of main switch S. The circuit for the relay 77 passes through the conductor 53, the contact arm 28, the contact rod 30, the roller 32, the arm 34, the conductor 79, the switch 76, the conductor 80, the conductor 81, the conductor 75, terminal 51 and the conductor 52 to the phase conductor 2. The actuating circuit for the solenoid s of main switch S passes from the phase conductor 1 through the conductor 64, the terminal 65, the conductor 82, the switch 78, the conductor 83, the terminal 84, the conductor 85, the conductor 86, the coil s and the conductor 87 to the phase conductor 2. The contact arm 11 of the main switch likewise controls the contacts 88, 89, and 90, whose purpose will be more clearly set forth in the following description of the method of operation of the system, but it may now be remarked that the contact arm 11 shall be so constructed that the contacts 9, 10 are not broken before the contacts 89 and 90 are closed.

In starting, the switch 6 is closed, which may occur in an appropriate manner by hand or automatically. Thereupon the regulator magnet 7 is excited, and the inlet to the power engine is opened, whereby the generator G is started. At the same time the coil 4 is likewise excited, and the switch 3 closes the circuit for the generator transformer T. The current induced thereby flows through the phase conductor 1, the conductor 8, the contact 9, the arm 11, the contact 10, the conductor 12, the switch coil 14, the conductor 13 to the phase conductor 2. When the current strength has attained the required value, the switch 15 is closed automatically, and its contact arms 16, 17, 18, 19 are thereby closed with the contacts 54, 55, 56, and 57 respectively. Thereby, in a manner known in and for itself, the synchronoscope SM with the coupling resistance F is coupled between, on the one hand, the phase conductors 20, 21 and, on the other hand, the phase conductor 2, i. e. through the conductors 63, 62 and 58. At the same time likewise the time relay 70 is actuated through the circuit 1, 64, 65, 66, 67, 68, 69 and 21 and after some time closes, by means of the switch 71, the circuit for the time relay 72, which, as already described, passes through the movable contacts 29, 31.

If now, for example, the generator G is driven at too great a speed, then the synchronoscope pointer begins to rotate clockwise, for example, and by means of the arm 28 produces contact between the segment 29 and the contact roller 31 for a certain time for each revolution. Thereby in the aforesaid manner the circuit for the time relay 72 is closed through 20, 55, 17, 16, 54, 53, 28, 29, 31, 33, 73, 71, 74, 75, 51, 52 and 2. Since however the time for which the contact segment 29 is in contact with the contact roller 31 is relatively short the relay 72 is not able to actuate the switch 76, with the consequence that the circuit for the rapidly operating relay 77 remains open. Consequently the circuit for the main switch Ss likewise remains open and the coupling of the generator G to the network N cannot occur. At the same time however the disk 40 is carried along by friction, and contact is produced between the rod 41 and the left contact 42. Thereby the one circuit for the regulating motor M' is closed through 20, 55, 17, 16, 54, 53, 28, 40, 41, 42, 44, 46, 48, 50, 51, 52 and 2, and the motor M' actuates the regulator C to decrease the inlet for the power engine and therewith the speed of the generator G. If on the other hand the generator rotates too slowly, the action is in principle the same as given above, but with the difference that the pointer V now rotates counterclockwise and produces a contact between the rod 41 and the right-hand contact 43. Thereby the other circuit for the regulating motor M' is closed, which passes through the contact 43, the conductor 45, the terminal 47, the conductor 49, and the conductors 50 and 52. The motor M' therewith changes its direction of rotation and actuates the regulator C and increases the inlet for the power engine and therewith the speed of the generator.

When the speed of the generator is thus increased or decreased, and its potential is brought more and more into phase with the network potential, the pointer V comes in known manner to gradually pass its central position more and more slowly in one direction or the other, with the consequence that the contact between the contact segment 29 and the contact roller 31 lasts for so long a time that the relay 72 may actuate the switch 76 so that the circuit for the relay 77 is closed through 20, 55, 17, 16, 54, 53, 28, 30, 32, 34 79, 76, 80, 81, 75, 51, 52 and 2 at the instant when the rod 30 contacts with the contact roller 32, i. e. when the pointer V is in its central position (that shown in Fig. 1) and thus the generator potential is in phase with the network potential or approximately in phase therewith. Upon the excitation of the relay 77, however, the switch 78 is instantaneously actuated, which closes the circuit for the coil s of the main switch S through 1, 64, 65, 82, 78, 83, 84, 85, 86, 87 and 2. The main switch is thus brought into action and couples the generator G to the network N.

Thereby likewise the contact arm 11 is actuated, so that the contacts 88, 89, and 90 are connected together and the contacts 9 and 10 broken. By the connection of the contacts 89 and 90 the main switch coil s is coupled directly between the phase conductors 1 and 2 through the conductors 91, 86, and 87, and the switch is maintained in its closed position. On the contrary, as stated, the contacts 9 and 10 are broken, with the consequence that the switch coil 14 is without current and the switch 15 entirely disconnects the synchronoscope SM together with all contact devices associated therewith. It is of importance that this disconnection should not occur before the main switch coil is excited through the contacts 89 and 90, since otherwise the consequence would be that the already coupled main switch would be opened at the same time as the opening of the switch 15.

At the same time, as stated, the contact 88 is closed likewise, through the contact arm 11, which has the consequence that a solenoid 92, which by means of a lever arrangement more clearly described in connection with Fig. 4 actuates the regulator to increase the inlet for the power engine, is coupled between the phase conductors 1 and 2 through the conductor 91, the arm 11, the contact 88, the conductor 93, a contact arrangement disposed at the regulator, the conductor 94 and the conductor 95. The power engine in this way tends to increase its speed and that of the generator G, with the consequence that the latter takes up its part of the load. If several generators are placed either in the same station or at different stations, by providing regulators for their driving engines with electrically actuated devices 92 of the described type, it is possible always to assure that the generators will each for itself take up such a part of the load as the regulators are adjusted for.

In the phase conductor 2 are disposed in known manner the switches 96, 97, actuated by the overload relays 98, 99, which at overload automatically cause a breaking of the circuit of the main switch coil s, so that an opening occurs. Normally the opening occurs by opening of the switch 6, whereby the circuit is broken at 3 and the regulator C closes the inlet to the power engine.

After the generator G is brought into phase and when it has been loaded, the potential in the conductors G' drops somewhat, which in known manner may be counteracted by increasing the potential of the field current of the generator. According to this invention the same potential regulation may be accomplished automatically in dependence upon the variations of potential in the conductors G'.

One form of execution of an arrangement provided for this purpose is shown in Figs. 1 and 5. In Fig. 1, H indicates the field windings of the generator, which is fed with current from a direct current generator L through the conductors 100 and 101 and a regulating resistance R. The regulating resistance R has the contact arm 102 driven by means of a worm gear transmission 103 from a reversible motor $M^2$, which is in known manner provided with two windings which, accordingly as the potential rises or falls, alternately are coupled between the phase conductors 1 and 2 to the generator transformer T. The two motor windings are connected at one end with the phase conductor 1 through a common conductor 104, while at the other ends they are connected through conductors 105 and 106 and through switches 107 and 108 actuated by the regulating arm 102, to contacts 109 and 110, which, accordingly as the potential in the phase conductors 1 and 2 drops or rises, by means of an automatically operating coupling or reversing device 112, are alternately connected to the phase conductor 2, so that the motor $M^2$ comes to rotate in one or the other direction and thereby to decrease or increase the regulating resistance R which is coupled in. The reversing device 112 is provided with a coil coupled through conductors 111 and 113 between the phase conductors 1 and 2 and with a core 114 actuated thereby, provided with a contact arm 115 which at normal potential is held suspended between the contacts 109 and 110, but which with a change of potential is brought into contact with one of these contacts. The core 114 is supported by a liquid braking device 116 which damps its movement.

The regulating resistance R has its contact arm 102 actuated by a spring 117, provided to rapidly return the contact arm 102 to its "rest" position shown in Fig. 1, upon the disconnecting of the generator G from the network. To render this possible, the arm 102 is releasably connected with the worm wheel of the transmission 103 by means of an automatically operating device, whose construction more clearly appears from Fig. 5. In this figure 102 designates the contact arm and 118 the worm wheel, and 119 the regulating resistance contacts. On the contact arm is disposed a horseshoe-shaped electromagnet 120, at whose lower leg is fastened hingedly at 121 an angularly bent armature 122. The lower arm of this armature is rotatable and in some degree even slidably connected with a locking pin 123 movably disposed on the contact arm 102, which in the position shown is out of engagement with the worm wheel 118 but which, when the magnet 120 is excited, is brought into engagement with the worm wheel by means of the armature 122 and thereby the arm 102 is locked fast to the worm wheel.

As appears from Fig. 1, the electromagnet 120 is coupled between the phase conductor 2 through the conductor 124 and the phase conductor 1 through the conductor 125, a contact 126 controlled by the contact arm 11 of the main switch S, and the conductor 91.

If, as stated above, the bringing into phase has occurred, the main switch arm 11 is in contact with the contact 126, and the electromagnet 120 is maintained excited through the aforesaid circuit 1, 91, 11, 126, 125, 124 and 2, so that the regulating resistance R has its contact arm 102 locked fast to the worm wheel 118.

Now assuming that the potential in the generator conductors drops, then the reversing device 112 with its contact 115 comes into contact with the lower contact 109, whereby the one winding of the motor $M^2$ receives current through 104, 105, the closed switch 107, 105, 109, 115 and the conductor 127. The motor $M^2$ is thereby set in rotation in one direction and by the worm wheel transmission 103 causes a revolution of the contact arm 102, so that the resistance R is cut out more or less, with the consequence that the potential in the field winding H and therewith in the phase conductors G' and 1, 2 rises. When the potential attains its normal value, the reversing device has its contact arm 115 drawn upward out of contact with the contact 109 and held suspended between this contact and the contact 110, whereby the motor $M^2$ is disconnected. Should the regulating arm 102 be rotated so much that the whole resistance R is cut out, the arm 102 actuates the switch 107, whereby likewise the motor $M^2$ is disconnected and the movement of the arm 102 ceases. Should, for example, by reason of the decrease of load, the potential increase above the normal value, the reversing arm 115 is carried upward and into contact with the upper contact 110, whereby the motor $M^2$ is coupled for movement in the opposite direction through 104, 106, the switch 108 now closed, 106, 110, 115 and 127. Thereby more or less of the resistance R is again coupled in, with the consequence that the potential drops and the reversing arm 115 is again brought to be suspended between the contacts 109 and 110, whereby the motor $M^2$ comes to a standstill. The left-hand end position of the arm 102, shown in the figures, in which the entire resistance R is coupled in the circuit 100, 101 of the field winding H, corresponds to the normal potential with the generator unloaded.

When the generator G for one reason or another is disconnected from the network N, the contact is broken at 126, the magnet 120 is without current and causes the release of the arm 102 from the worm wheel 118, with the consequence that the arm 102 is rapidly returned by the action of the spring 117 to its "rest" position shown in Fig. 1. A possible starting of the motor $M^2$ will not have any influence upon the regulating arm 102, which remains in its "rest" position.

The centrifugal regulator C shown in Fig. 6 on an enlarged scale and in section is in essence well known as to its constructive details. The centrifugal weights 129 acting upon the regulating rod 128 are so driven in the usual manner by the gear transmission 130, 131, the shaft 132 of the drive 131 is coupled to the synchronous motor M shown in Fig. 1 and driven from the generator G. The lower regulating rod 135 connected through a lever 133 and a rod 134 with the inlet device for the power engine in known manner, is supported by a spiral spring 136 which counteracts the weights 129 in the pressure exerted through rod 128. The spring 136 is maintained under tension between the bottom of a sleeve 137 and an upper plate 138 connected with the rod 135. The sleeve 137 rests by means of balls against the bottom of another sleeve 139, which is formed as a worm wheel and by means of internal threads engages in corresponding threads on a fixed hollow pin 140, in which the regulating rod 135 is movable. In the worm wheel sleeve 139 engages a worm 141, connected with a gear 142, into which engages a pinion 143. By rotation of the pinion 143 in one direction or the other, the worm wheel sleeve 139 is caused by the transmission arrangement shown to rotate to a corresponding degree and by means of the threads to raise or lower on the pin 140, with the consequence that, by reason of the increase or decrease of the tension in the spring 136 produced thereby, the regulating rod 135 comes to be raised or lowered and thereby increase or decrease the inlet to the power engine. The shaft 144 of the pinion 143 is, according to the invention, coupled to the automatically reversible motor M' shown in Fig. 1, which as previously described is regulated during the bringing into phase by the contact device 41, 42, 43 controlled by the synchronoscope SM.

In Fig. 6, 92 designates the electrically actuated device, as in Fig. 1, which as described has the purpose of, when bringing into phase has occurred, of actuating the regulator C to increase the inlet of the power engine, so that the latter tends to increase the speed of the generator and this latter thereby to take up its share of the load. The movable core 145 of the coil 92 is thereby rotatably connected with the one arm 146 of a crank lever, which at the angle is rotatably disposed on a pin 147 fixed to the regulator casing. At the other end 148 of the lever is rockably connected a link 149, which at its other end is rockably connected with two links 150 and 151 disposed at an angle to each other, forming a toggle. The link 150 is at its other end rockably connected with the sleeve 137 supporting the loading spring 136, while the corresponding end of the link 151 is rockably connected with a sleeve the arm 146 of the crank lever is further rockably connected a rod 153 which at its lower end is connected with a lever 154, rockably disposed on a pin 155 fixed on the regulator casing. The free end of the lever 154 forms a stop for one end of a further lever 156, rockably disposed on a pin 157 fixed on the regulator casing and introduced at its other end into a sleeve 159 movable relatively to the regulator rod 135. The sleeve 159 is at its lower end provided with an arm 160, which forms a stop for a nut 161 disposed on the regulator rod 134.

The coil 92 is coupled through the contacts 162 and 163, of which the latter is supported at one end of a lever 164 whose other end is movably connected with the regulator rod 128, so that the contacts 162, 163 are closed when the end of the lever 164 connected with the rod 128 is carried downward.

Now assuming that the bringing of the generator G into phase with the network N has occurred and that the contacts 162, 163 are closed by the regulating rod 128 in its action upon the lever 164, then the coil 92 is excited through the stated circuit 91, 11, 88, 93, 94 and 95, Fig. 1. The iron core 145 is attracted upward and tends through the lever 146, 148 and the link 149 to straighten out the toggle 150, 151, with the consequence that the sleeve 137 with the spring 136 and therewith the plate 138 with the regulating rod 128 are carried upward, so that by the lever 133 and the rod 134 the inlet to the power engine is increased. This may occur unhindered, since at the same time as the lifting of the lever arm 146 the end of the lever 154 which forms a stop for the lever 156 is carried downward by the action of the rod 153 and thus the sleeve 159 with the stop 160, when the locking lever 156 is released, may move upward to a sufficient extent, imparting upward movement to the regulating rod 135 and the lever 133 together with the actuating rod 134. It should be remarked that even in the locked position shown for the sleeve 159 with the stop 160, the regulating rods 135 and 134 may move unhindered downward during and for the decrease of the inlet to the power engine. If on the other hand the contacts 162 and 163 are not closed, which occurs if, for example, by reason of a break in the conductors or the like, the motor M driving the centrifugal weights 129 is not started, and so the coil 92 is not excited, and the levers 154 and 156 are maintained in the locked positions shown, with the consequence that the regulating rods 135, 134 cannot be carried further upward and cause the opening of the inlet and therewith possibly an injury to the power engine and generator.

At the pivotal pin 155 for the lever 154 is likewise rockably connected another lever 165, which at one end is rockably connected with the piston rod 166 of a piston 167 which, for example, is actuated by the liquid pressure at the inflow side of a water turbine serving as power engine, or by the steam pressure of a steam engine. At the other end of the lever 165 is disposed a set screw 168, serving as a stop for the lever 156 and limiting the rocking movement of the said lever 156, whereby the upward movement of the sleeve 159 with the stop 160 and therewith of the regulating rods 135, 134 and thus likewise the effect of the power engine are automatically varied in correspondence with the variations of the pressure of the driving medium. It is apparent that the pressure actuated piston 167 may be replaced by a float arrangement or the like which is actuated by the water level in the inflow pipe to a water turbine.

The diagrammatically shown, electrically actuated devices may apparently be of any known type. Further, if so desired, the relays 70 and 77 shown in Fig. 1 may be eliminated. The circuit for the relay 72 is coupled in this case through the switch 15 and closed, when this switch is connected, in the described manner through the contacts 29, 31, while the switch 76 controlled by the relay 72 is coupled directly in the actuating circuit for the main switch S. Likewise the automatically regulated resistance R as shown may be connected to the field winding of the feeding machine L instead of to the field winding of the generator.

It is apparent that a similar lock-out arrangement may be formed by connecting the contacts on the speed regulator in series with the conductor 12, and connecting the solenoid or electromagnet 92 between the phase conductor 2 and the contact 88. By this means, the actuating solenoid 14 of the switch 15 remains without current if the speed regulator C does not pick up, and hence the synchronoscope is not brought into action until it has been determined that the speed regulator may properly control the generator.

Figs. 7 and 8 show a modified form of the contact devices for the synchronoscope. The shaft 27a of the synchronoscope SMa passes through the insulating panel 24k, and has a stop pin 39b therein. The insulating sleeve and flanges 28c are secured mechanically to the shaft 27a by the nut 39a on the shaft. A metal sleeve 28e has the movable element 28a of the synchronoscope rigid therewith and is mechanically fixed to these insulating members, so that this element turns positively with the synchronoscope motor SMa. The element 28a has at the end the contact segment 29a as before, to cooperate with the contact roller 31a. Likewise at this end, the element 28a has the two rods 30a and 30b which are disposed parallel to the shaft 27a, and project toward the panel 24k of the device. These rods 30a, 30b are each insulated from the element 28a. Near its center, the element 28a also carries the opposed rods 40a, 40b located on an arc at the same radius from the axis of 27a, and are insulated from the element 28a. These rods 40a, 40b are connected by the crossed insulated leads 44a, 44b to the respective rods 30a, 30b. A central rod 30c is also preferably fixed mechanically and electrically to the element 28a between and upon the same arc as the rods 30a, 30b.

A contact member 28d is rotatable about the sleeve 28e, but normally is frictionally driven thereby only until its projecting pin 40x comes into engagement with the fixed contact 42a or 43a according to the direction of rotation of the synchronoscope, and is held thereby and remains in electrical contact therewith.

A further member 39c is likewise rotatable about the contact member 28d, and has a projecting pin 39d which is engaged by the rods 40a, 40b selectively according to the direction of rotation of the synchronoscope.

The conductor 53, as in Fig. 1, is connected by a flexible jumper wire 53a to the member 28d, so that this member may rock freely within the limits set by the contacts 42a, 43a.

The operation of this device is as follows: When the synchronoscope motor SMa rotates, it carries the element 28a along with it. As the element 28a turns, the rod 40a or 40b is moved, according to the direction of rotation, into engagement with the finger pin 39d which establishes an electrical and mechanical driving relation therewith; and this electrical and driving connection is maintained so long as the synchronoscope continues to rotate in the given direction, i. e. so long as the out-of-phase direction between the generator and network potentials remains positive or negative. This results in the electrical connection through the members 39c and 28d with the conductors 53, 53a, and as the member 28d is frictionally driven with the element 28a, and member 39c, a circuit is established through it from the conductors 53, 53a, to one of the contacts 42a or 43a, as with Fig. 1, and the motor M' as described above for the first form, whereby the motor M' is set into movement in one direction or the other to adjust the speed regulator to produce synchronism.

The rod 40a or 40b which is electrically in contact and circuit is cross-connected to the respective rod 30a or 30b so that although the rod 40a or 40b must lag behind in obtaining its mechanical and electrical connection, yet it is electrically connected to a rod 30a, or 30b, which is in advance of the central point or the rod 30c, and makes contact with the roller 32a at a point in time in advance with regard to that of the first form, so that the electrical and mechanical elements of the system are brought into action just before synchronism is attained. It is apparent that the amount by which this pre-actuation is accomplished may be determined by proper selection of the angular separation of the rods 30a, 30b, 40a, 40b from the center line of the movable element 28a.

This result is obtained whether the synchronism is being attained by slowing down or speeding up the generator; in one case the rod 40a cooperates with the rod 30a, and in the other case, the rod 40b cooperates with the rod 30b. The duration of the contact depends upon the size of the rods 30a and 30b. When a central rod 30c is also provided, then an instant after the contact with the advancing rod 30a or 30b has occurred, a contact is likewise made with the central rod 30c which is directly upon the main body of the movable element 28a, and in electrical contact and connection directly with the conductor 53. It is preferred that this contact with the central rod 30c should occur before a break with the rod 30a or 30b; but in any event, as soon as contact with the rod 30c is broken, all circuits are opened i. e. a "reverse operation" is accomplished as before in the first form since the circuit from the other contact 30b or 30a is interrupted at the respective rod 40b or 40a. Hence the actuation of the switches to connect the generator to the network may occur just before or at synchronism; but cannot occur after synchronous relationship has passed, and the machine is moving out of synchronism with the network.

It is also possible to form the long and short contacts as fixed elements, and to move the roller contacts past them in unison with the movement of the synchronoscope or similar device. This is represented in Figs. 9, 10, and 11, where a stationary insulating cam disk 200 has a short contact segment 201 and a long contact segment 202 on its periphery. The movable element 28a is fastened to a sleeve 204 which revolves about a spindle 205, and frictionally carries and drives a contact member 206 which has a projecting pin 207 to engage with one of the contacts 42b or 42c, according to the direction of movement of the element 203. This element is connected for synchronous driving as before, for example by the engagement of the pins 208 with the pointer V. The other end of the element 203 is bent over to receive and support the two ends of the shaft 209 for the contact roller 210, which is preferably of carbon to prevent sticking and arcing, and has two contact ridges with a central groove so as to assure a firm contact with the respective contacts 201 and 202. The element 203 is provided with radial slots 211 to receive these shaft ends, and has a leaf spring 212 with a slightly curved free end to engage the shaft and serving to establish a firm electrical contact between the shaft and the movable element 203. When the speed of the synchronoscope becomes great, the roller 210 is thrown outward by centrifugal force, even at the top of the contact disk 200, so that no closure of circuits and actuation of the coupled electrical and mechanical devices can occur at such large departures from synchronism of generator and network. When however the generator comes practically into phase with the line, the weight of the roller 210 causes it to drop into contact with the disk 200 for the upper part of the periphery of the disk, and thus to come into the required electrical association with the contacts 201 and 202; and the electrical and mechanical actions may begin. Since the action of the parts in this form is substantially the same as before, no detailed statement of operation is necessary.

It is obvious that further changes and modifications may be made with regard to the illustrative forms shown, without departing from the spirit of the invention as defined in the appended claims.

I claim:

1. A synchronizing device including means operated by currents from two different sources, a movable element operated by said means in accordance with the difference in frequency of the currents from said sources, a contact segment and a contact roller contacting therewith, one thereof being moved by said movable element, and means for guiding said roller for movement toward and from said segment.

2. In an electrical system wherein two sources of alternating current are to be synchronized, a circuit breaker for connecting said sources together, a synchronizing device having a movable contact rotor with a plurality of distributing contacts, fixed contacts contacting therewith, a single contact connected to all of said distributing contacts and circuits controlled through said contacts for connecting said sources together substantially at synchronism.

3. In an electrical system wherein two sources of alternating current are to be synchronized, a circuit breaker for connecting said sources together closing means for operating said circuit breaker, a synchronizing device including means operated by the frequencies of the currents from said sources, a movable element operated by said synchronizing device in accordance with difference in frequencies of the currents from said sources, a plurality of circuit closers operated by said movable element, said circuit closers being adapted to initially operate said circuit breaker closing means in advance of approaching synchronism when the frequency difference between the said sources is within predetermined limits, for connecting said sources together.

4. In an electrical system wherein two sources of alternating current are to be synchronized, a circuit breaker for connecting said sources together, a synchronizing device, control means operated by said synchronizing device for operating said circuit breaker, said control means including a circuit, and a centrifugally operated switch in said circuit driven by said synchronizing device.

5. In an electrical system wherein two sources of alternating current are to be synchronized, a circuit breaker for connecting said sources together, a control circuit for operating said circuit breaker, a switch in said circuit, means for operating said switch when the frequency and phase relation of the currents are within permissible limits, a second switch in said control circuit, a synchronizing device, a movable member moved thereby and operating to close said second switch at a predetermined phase angle in advance of synchronism and to open it in advance of a corresponding phase angle past synchronism.

6. In an electrical system wherein two sources of alternating current are to be synchronized, a circuit breaker for connecting said sources together, a synchronizing device, a rotatable member rotated thereby, a support adjacent said rotatable member, one thereof carrying three juxtaposed contacts and the other a contactor adapted to contact therewith, a control circuit for operating said circuit breaker, the intermediate of said contacts and said contactor being included in said circuit, means for connecting one of the adjacent contacts to the intermediate contact when the rotatable member travels in one direction and the other of said adjacent contacts to the intermediate contact when the rotatable member travels in the other direction.

7. In an electrical system, wherein two sources of alternating current are to be connected, switching means for connecting said sources together, means for preventing operation of said switching means when the frequency difference between said sources exceeds permissible limits, control means including moving means adapted to occupy definite positions corresponding to the phase relation of said sources, said moving means including means arranged to initiate quickly the operation of said switching means at a phase angle in advance of phase coincidence, and said moving means having means arranged to procure reverse operation of said switching means at a phase angle with respect to phase coincidence differing in magnitude from said first named phase angle.

8. In an electrical system, wherein two sources of alternating current are to be connected, switching means for connecting said sources together, means for preventing operation of said switching means when the frequency difference between said sources exceeds permissible limits, control means including moving means adapted to occupy definite positions corresponding to the phase relation of said sources, said moving means including means arranged to initiate quickly the operation of said switching means at a phase angle in advance of phase coincidence, and said moving means having means arranged to procure a reverse operation of said switching means at a lesser phase angle in advance of phase coincidence than said first named phase angle.

9. In an electrical system, wherein two sources of alternating current are to be connected, switching means for connecting said sources together, means for preventing operation of said switching means when the frequency difference between said sources exceeds permissible limits, control means including moving means adapted to occupy definite positions corresponding with the phase relation of said sources, said moving means including means arranged to initiate quickly the operation of said switching means at a phase angle in advance of phase coincidence, and said moving means having means arranged to procure a reverse operation of said switching means substantially at phase coincidence.

10. In an electrical system wherein two sources of alternating current are to be connected, switching means for connecting said sources together, means for preventing operation of said switching means when the frequency difference between said sources exceeds permissible limits, control means including moving means adapted to occupy definite positions corresponding to the phase relation of said sources, said moving means including means arranged to initiate quickly the operation of said switching means at a phase angle in advance of phase coincidence, and said moving means having means arranged to procure reverse operation of said switching means at a phase angle past phase coincidence of lesser magnitude than said first named phase angle.

11. In an electrical system, wherein two sources of alternating current are to be connected, switching means for connecting said sources together, means for preventing operation of said switching means when the frequency difference between said sources exceeds permissible limits, control means including moving means adapted to occupy definite positions corresponding with the phase relation between said sources, said moving means including means arranged to initiate quickly the operation of said switching means at a phase angle in advance of phase coincidence, and said moving means having means supplementing the action of said first named means and being adapted upon inaction of said first named means to initiate the operation of said switching means at a lesser phase angle in advance of phase coincidence, and means arranged to procure reverse operation of said switching means at a phase angle of lesser magnitude with respect to phase coincidence than said first named phase angle.

12. In an electrical system wherein two sources of alternating current are to be connected, switching means for connecting said sources together, phase and frequency responsive means for controlling the operation of said switching means, a protective device for preventing said phase and frequency responsive means from operating said switching means when abnormal operating conditions of one of said sources prevails.

13. In an electrical system wherein two sources of alternating current are to be connected together, a circuit closer for connecting said sources together, normally inoperative control means responsive to the phase and frequency difference between said alternating currents for operating said circuit closer, and a centrifugally operated device for rendering and maintaining said control means operative when the frequency difference between said alternating currents is within permissible limits.

14. In an electrical system wherein two sources of alternating current are to be synchronized, a protective device in one of said sources, a circuit closer for connecting said sources together, a synchronizer, a control circuit operated by said synchronizer for operating said circuit breaker, and a normally inoperative switch in said control circuit adapted to be actuated by said protective device to render said synchronizer operative to close said circuit closer when normal operating conditions prevail in one of said sources.

15. A synchronizing device for employment in the automatic parallel coupling of a synchronous alternator to an alternating current network, including a synchroscope having a movable element operated by currents derived from the alternator and from the network, a detachable housing including a rotatable member adapted to be supported coaxially with the movable element when said housing is mounted on the synchroscope casing, means for driving said rotatable member of the detachable housing from the movable element of the synchroscope, contact devices mounted on said detachable housing and insulated therefrom, said movable element of the detachable housing including a contact sector and a contact rod for respectively engaging said contact devices, and other contacts on the detachable housing adapted to be respectively engaged according to the direction of movement of the movable element of the synchroscope.

16. A synchronizing device including means operated by currents from two different sources, a movable element operated by said means in accordance with the difference in frequency of the currents from said sources, a contact segment moved by said movable element, a contact roller, and a support for said roller adapted to guide it for yielding movement against the contact segment during the movement of the latter.

17. A synchronizing device including means operated by currents from two different sources, a frame fixed relative thereto, a movable element operated by said means in accordance with the difference in frequency of the currents from said sources, a contact segment moved by said movable element, a contact roller, a lever pivotally mounted on said frame and supporting said roller for rotation, and means for resiliently holding said roller engaged with said segment throughout a predetermined portion of the movement of the movable element of the synchronizing device.

18. A synchronizing device including means operated by currents from two different sources, a frame fixed relative thereto, a movable element operated by said means in accordance with the difference in frequency of the currents from said sources, a contact segment moved by said movable element, a contact roller, a lever pivotally mounted on said frame and supporting said roller for rotation, means for resiliently holding said roller in contact with said segment through a predetermined portion of the movement of the movable element of the synchronizing device and a stop to limit the movement of the roller toward the axis of movement of the segment during the remaining portion of the rotation thereof.

19. A synchronizing device having a movable element and a first contact moved in a circular path by said movable element, a roller second contact located above and for contacting with said first contact, and means located outside said path for supporting said second contact whereby it may be moved downward by the force of gravity and maintained for yielding engagement with said first contact during the contacting of said contacts.

20. In an electrical system wherein two sources of alternating current are to be connected, switching means for connecting said sources together, a synchronizing device including a first movable member and means for rotating the same in one direction at a frequency dependent upon the difference between the frequencies of said sources when one said source is generating a frequency less than the frequency of the other said source and for rotating said member in the opposite direction when the frequency of said one source is greater than the frequency of said other source, and a second movable member moved between end positions with and according to the direction of rotation of said first movable member, and means controlled by the positions of said movable members for initiating the closing of said switching means.

21. In an electrical system wherein two sources of alternating current are to be connected, switching means for connecting said sources together, a synchronizing device including a first movable member and means for rotating the same in one direction at a frequency dependent upon the difference between the frequencies of said sources when one said source is generating a frequency less than the frequency of the other said source and for rotating said member in the opposite direction when the frequency of said one source is greater than the frequency of said other source, and a second movable member moved between end positions according to the direction of rotation of said first movable member, and means controlled by the positions of said movable members for initiating the closing of said switching means, said second movable member operating according to its position for initiating the closing when said first source is substantially at a predetermined phase angle in advance of phase coincidence and to procure a reverse operation at a phase angle differing in magnitude with respect to phase coincidence from said first phase angle.

22. In an electrical system wherein two sources of alternating current are to be connected, switching means for connecting said sources together, a synchronizing device including a first movable member and means for rotating the same in one direction at a frequency dependent upon the difference between the frequencies of said sources when one said source is generating a frequency less than the frequency of the other said source and for rotating said member in the opposite direction when the frequency of said one source is greater than the frequency of said other source, whereby said first movable member by its position in rotation operates in accordance with the phase difference between the currents of said sources, a second movable member operated between end positions accordingly as said first source is generating a current of lesser or greater frequency than said other source, and means controlled by the position of said members for quickly initiating the operation of said switching means when said first source is at a predetermined phase angle in advance of phase coincidence, and for procuring a reverse operation at a different phase angle with respect to phase coincidence than said first phase angle.

23. In an electrical system wherein two sources of alternating current are to be connected, switching means for connecting said source together, a synchronizing device including a rotatable member and a rockable member movable between end positions, and means for rotating said rotatable member in one direction at a frequency dependent upon the difference between the frequencies of said sources when said source is generating a frequency less than the frequency of the other said source and for rotating said rotatable member in the opposite direction when the frequency of said one source is greater than the frequency of said other source, interengaging means on said members whereby the rotation of said rotatable member in one direction will move said rockable member to one end position and the rotation of said rotatable member in the other direction will move the rockable member to the other end position, and means controlled by the positions of said members for initiating the closing of said switching means.

24. In an electrical system, wherein two sources of alternating current are to be connected, switching means for connecting said sources together, means for preventing operation of said switching means when the frequency difference between said sources exceeds permissible limits, control means including a moving part, said control means being responsive to the potentials of said sources for procuring movement of said moving part in accordance with the phase relation between said sources, and contact means controlled by said moving part and arranged to operate at a phase angle in advance of phase coincidence and to initiate quickly the operation of said switching means and to procure reverse operation of said contact means at a phase angle with respect to phase coincidence differing in magnitude from said first named phase angle.

25. In an electrical system wherein two sources of alternating current are to be connected, switching means for connecting said sources together, means for preventing operation of said switching means when the frequency difference between said sources exceeds permissible limits, control means including a moving part, said control means being responsive to the potentials of said sources for procuring movement of said moving part in accordance with the phase relation between said sources, and contact means controlled by said moving part and arranged to operate at a phase angle in advance of phase coincidence and to initiate quickly the operation of said switching means, and to procure reverse operation of said contact means at a lesser phase angle in advance of phase coincidence.

26. In an electrical system, wherein two sources of alternating current are to be connected, switching means for connecting said sources together, means for preventing operation of said switching means when the frequency difference between said sources exceeds permissible limits, control means including a moving part, said control means being responsive to the potentials of said sources for procuring movement of said moving part in accordance with the phase relation between said sources, contact means controlled by said moving part and arranged to operate at a phase angle in advance of phase coincidence and to initiate quickly the operation of said switching means, and to procure a reverse operation substantially at phase coincidence.

27. In an electrical system wherein two sources of alternating current are to be connected, switching means for connecting said sources together, means for preventing operation of said switching means when the frequency difference between said sources exceeds permissible limits, control means including a moving part, said control means being responsive to the potentials of said sources for procuring movement of said moving part in accordance with the phase relation between said sources, contact means controlled by said moving part and arranged to operate at a phase angle in advance of phase coincidence and to initiate quickly the operation of said switching means, other contact means supplementing the action of said first named contact means and being adapted upon inaction of said first named contact means to initiate the operation of said switching means at a lesser phase angle in advance of phase coincidence, and means arranged to procure reverse operation of said second named contact means at a lesser phase angle with respect to phase coincidence than said first named phase angle.

ERICK PEARSON.